United States Patent
Zhu

(10) Patent No.: US 9,229,255 B2
(45) Date of Patent: Jan. 5, 2016

(54) MANUFACTURING METHOD OF LIQUID CRYSTAL PANEL

(75) Inventor: Meina Zhu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 448 days.

(21) Appl. No.: 13/637,884

(22) PCT Filed: Aug. 29, 2012

(86) PCT No.: PCT/CN2012/080682
§ 371 (c)(1),
(2), (4) Date: Sep. 27, 2012

(87) PCT Pub. No.: WO2014/029116
PCT Pub. Date: Feb. 27, 2014

(65) Prior Publication Data
US 2014/0057518 A1    Feb. 27, 2014

(30) Foreign Application Priority Data
Aug. 22, 2012 (CN) .......................... 2012 1 0299023

(51) Int. Cl.
*H01J 9/24* (2006.01)
*G02F 1/1333* (2006.01)
*G02F 1/1337* (2006.01)

(52) U.S. Cl.
CPC ............ *G02F 1/1333* (2013.01); *G02F 1/1337* (2013.01); *G02F 2201/50* (2013.01)

(58) Field of Classification Search
CPC combination set(s) only.
See application file for complete search history.

(56) References Cited

U.S. PATENT DOCUMENTS

2004/0196215 A1* 10/2004 Duthaler et al. ................. 345/30
2005/0224802 A1* 10/2005 Seo et al. .......................... 257/72

FOREIGN PATENT DOCUMENTS

JP          11095180 A  *  4/1999
WO     WO 2011152590 A1 *  12/2011

* cited by examiner

*Primary Examiner* — Nimeshkumar Patel
*Assistant Examiner* — Brenitra M Lee
(74) *Attorney, Agent, or Firm* — Kirton McConkie; Evan R. Witt

(57) ABSTRACT

A manufacturing method of a liquid crystal panel is proposed. The manufacturing method includes the following steps of: providing a first substrate and a second substrate; coating the first substrate for forming an alignment film; forming a passivation layer on the surface of the alignment film; removing the passivation layer when a predetermined Q-time arrives; liquid crystals are sprayed onto the surface of the alignment film; attaching the second substrate to the first substrate for forming the liquid crystal panel. The surface of the alignment film could keep clean all the time, which help increase the yield rate of liquid crystal panels.

16 Claims, 3 Drawing Sheets

MANUFACTURING METHOD OF LIQUID CRYSTAL PANEL

BACKGROUND OF THE INVENTION

1. Field of the Invention

The present invention relates to the field of liquid crystal panel manufacturing, and more particularly, to a manufacturing method of a liquid crystal panel.

2. Description of the Prior Art

With the progressing development of the liquid crystal display (LCD) technology, the demand for high-quality LCDs soars.

Refer to FIG. 1 showing a top view of a conventional thin film transistor (TFT) substrate.

The TFT substrate comprises a glass base 10. A sealant coating domain 11 and an alignment coating domain 12 are formed on the glass base 10. The alignment coating domain 12 covers a display domain (not shown). The sealant coating domain 11 is coated and a sealant is formed. The sealant is used for attaching the TFT substrate to a Color Filter (CF) substrate. The alignment coating domain 12 is coated and an alignment film made of polyimide (PI) is formed.

In the conventional technology, the alignment film is formed through inkjet printing for alignment films. Firstly, alignment material is sprayed on the alignment coating domain 12. Next, the alignment material is baked and cured. Finally, the alignment film is formed.

It needs a waiting Q-time before liquid crystals are allowed to be sprayed onto the surface of the alignment film after the alignment film is formed (for example, after the alignment film is baked and formed) in the TFT-LCD manufacturing process. Hydrolysis tends to occur at the alignment film in this process because of moisture from the air. The possibility of alignment on liquid crystals in the following steps would be affected, causing mura to occur in the manufactured liquid crystal panel. In addition, particles flowing in the air might drop on the surface of the alignment film in this process, causing mura to occur in the manufactured liquid crystal panel as well. Accordingly, the display effect of the manufactured liquid crystal panel is affected greatly.

In conclusion, the mura defect exists in the manufactured liquid crystal panel. The mura defect is caused by hydrolysis occurring to the alignment film or particles in the air dropping on the surface of the alignment film after the alignment film is formed and before liquid crystals are sprayed onto the alignment film. To find ways to solve the above-mentioned problem successfully is one of the goals for the LCD industry.

SUMMARY OF THE INVENTION

An object of the present invention is to provide a manufacturing method of a liquid crystal panel for solving the problem that a mura defect exists in liquid crystal panels in the conventional technology. The mura defect is caused by hydrolysis which occurs at the alignment film made of PI or particles in the air dropping on the surface of the alignment film after the alignment film is formed and before liquid crystals are sprayed onto the alignment film.

According to the present invention, a manufacturing method of a liquid crystal panel, comprises following steps of:

providing a first substrate and a second substrate, and coating an alignment film the first substrate for forming made, wherein the first substrate is a thin film transistor (TFT) substrate;

forming a passivation layer on a surface of the alignment film;

removing the passivation layer when a predetermined Q-time arrives; and spraying liquid crystals onto the surface of the alignment film, and attaching the second substrate to the first substrate for forming a liquid crystal panel.

In one aspect of the present invention, the passivation layer is made of polymers.

In another aspect of the present invention, the polymers are polyurethane (PU).

In another aspect of the present invention, the step of removing the passivation layer comprises:

spraying a solvent on the passivation layer for dissolving and removing the passivation layer with the solvent.

In another aspect of the present invention, the step of removing the passivation layer comprises:

heating the passivation layer to decompose the passivation layer.

In another aspect of the present invention, the step of removing the passivation layer comprises:

illuminating the passivation layer to decompose the passivation. layer.

In another aspect of the present invention, the predetermined Q-time is between 10 and 30 seconds.

In another aspect of the present invention, the second substrate is a color filter (CF) substrate.

According to the present invention, a manufacturing method of a liquid crystal panel, comprising following steps of:

providing a first substrate and a second substrate, and coating an alignment film on the first substrate;

forming a passivation layer on a surface of the alignment film;

removing the passivation layer when a predetermined Q-time arrives;

spraying liquid crystals onto the surface of the alignment film, and attaching the second substrate to the first substrate for forming a liquid crystal panel.

In one aspect of the present invention, the passivation layer is made of polymers.

In another aspect of the present invention, the polymers are polyurethane (PU).

In another aspect of the present invention, the step of forming the passivation layer on the surface of the alignment film comprises:

forming the passivation layer on the surface of the alignment film by means of coating.

In another aspect of the present invention, the step of removing the passivation layer comprises:

spraying a solvent on the passivation layer for dissolving and removing the passivation layer with the solvent.

In another aspect of the present invention, the step of removing the passivation layer comprises:

heating the passivation layer to decompose the passivation layer.

In another aspect of the present invention, the step of removing the passivation layer comprises:

illuminating the passivation layer to decompose the passivation layer.

In another aspect of the present invention, the predetermined Q-time is between 10 and 30 seconds.

In another aspect of the present invention, the first substrate is a thin film transistor (TFT) substrate.

In another aspect of the present invention, the second substrate is a color filter (CF) substrate.

Contrast to the conventional technology, a passivation layer is formed on the surface of the alignment film after the alignment film is formed and before liquid crystals are sprayed onto the alignment film in the present invention. The passivation layer is effective for preventing hydrolysis occurring at the alignment film, which prolongs the process Q-time that the manufacturing process needs. The passivation layer is also effective for preventing particles flowing in the air from dropping on the surface of the alignment film. The surface of the alignment film could maintain clean all the time, which increases the yield rate of liquid crystal panels.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
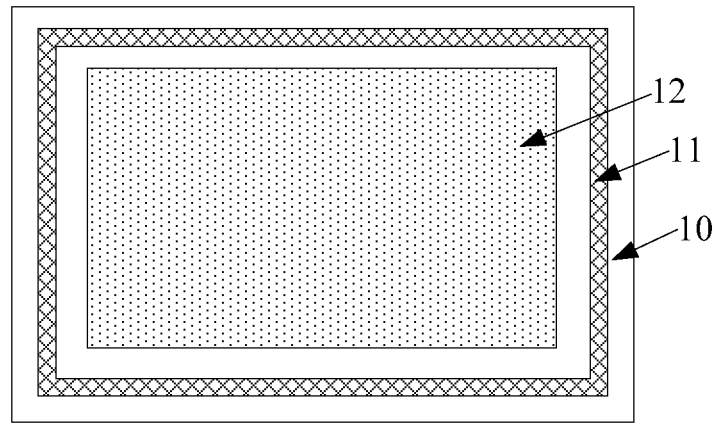
FIG. 1 shows a top view of a conventional thin film transistor (TFT) substrate.
Figure 2:
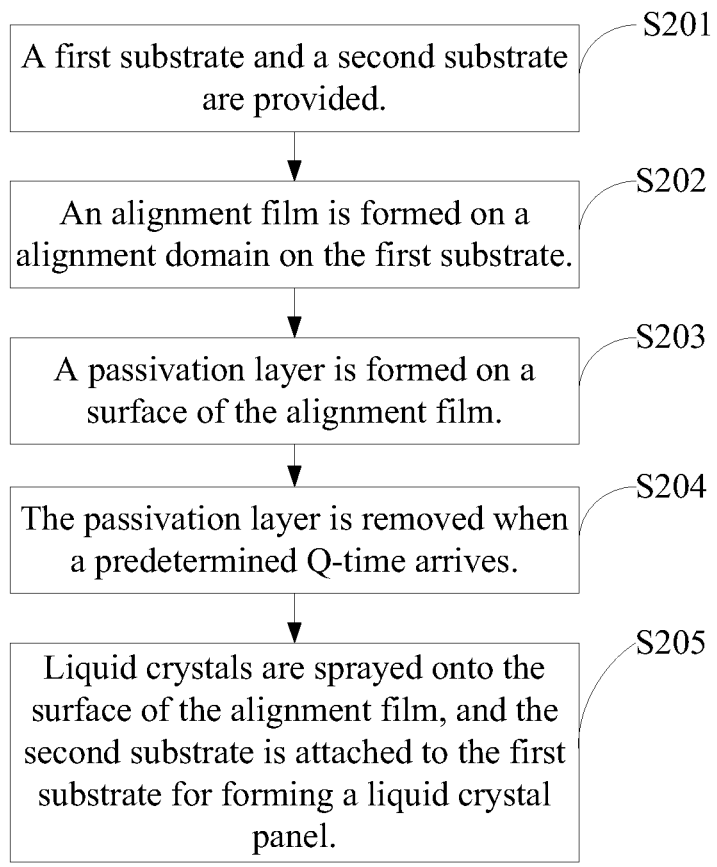
FIG. 2 shows a flow chart of a manufacturing method of a liquid crystal panel in the present invention.

Refer to FIG. 2 showing a flow chart of a manufacturing method of a liquid crystal panel in the present invention.

In Step S201, a first substrate and a second substrate are provided.

Figure 3:
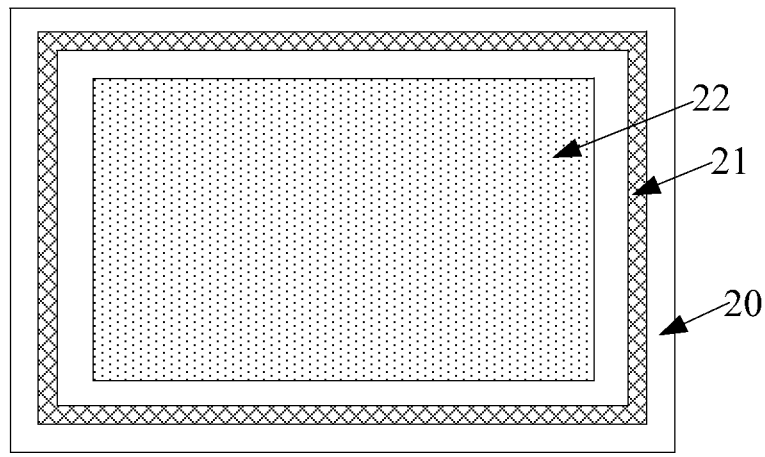
FIG. 3 is a top view of a TFT substrate before an alignment film is formed on it.

The first substrate could be a TFT substrate. The first substrate comprises a base 20, a sealant domain 21, and an alignment domain 22, as shown in FIG. 3. The second substrate could be a CF substrate.

Figure 4:
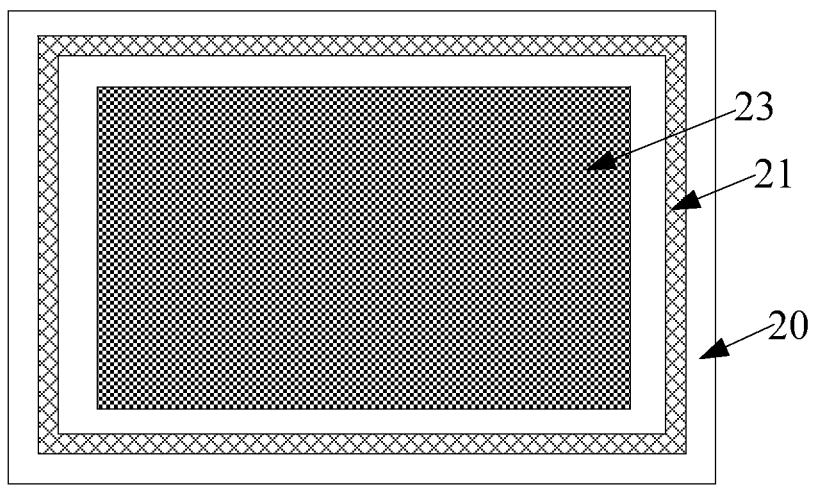
FIG. 4 is a top view of a TFT substrate after an alignment film is formed on it.

In Step S202, the alignment domain 22 is coated and an alignment film 23 made of polyimide (PI) is formed. The alignment film 23 is formed on the surface of the first substrate, as shown in FIG. 4.

In the course of implementation, the alignment film 23 is formed through inkjet printing for alignment films. Firstly, alignment material is sprayed onto the alignment domain 22. Next, the injected alignment material is baked and cured. Finally, the alignment film 23 is formed.

Figure 5:
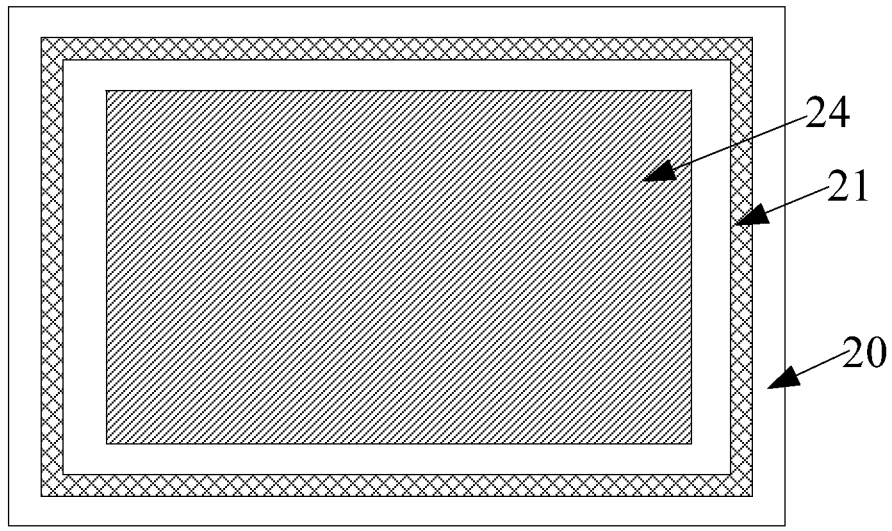
FIG. 5 is a top view of a TFT substrate after a passivation layer is formed on it.

In Step S203, a passivation layer 24 is formed on the surface of the alignment film 23, as shown in FIG. 5.

Preferably, the passivation layer 24 is made of polymers. The polymers are hydrolysis resistant that is moisture from the air does not react with the polymers. For example, the polymers are polyurethane (PU). The materials used for forming the passivation layer 24 could be resolved when being heated at high temperature. For example, PU could be resolved at 220 degrees Celsius. Or, the materials used for forming the passivation layer 24 could be dissolved in a specific solvent.

Preferably, the passivation layer 24 is formed through inkjet printing. The passivation layer 24 could also be formed by means of coating or any other workable method. The detailed description of methods for forming the passivation layer 24 will not herein be repeated.

In Step S204, the passivation layer 24 is removed when a predetermined Q-time arrives; that is, the state as shown in FIG. 4 is recovered.

Preferably, the range of the predetermined Q-time is 10 to 30 seconds. For example, the Q-time is set as 20 seconds. After the 20 seconds, the passivation layer 24 is removed.

In the course of implementation, the passivation layer 24 could be removed in the following methods.

Firstly, the passivation layer 24 is heated at high temperature. The passivation layer 24 would be resolved and removed.

Secondly, a solvent is spayed on the passivation layer 24. The passivation layer 24 would be dissolved and removed in the solvent. For example, firstly, an ethyl acetate solvent is sprayed on the passivation layer 24 made of PU. Next, the PU is dissolved in the ethyl acetate solvent and forms liquid. At last, the solvent is poured out of the base 20, which completes the removal of the passivation layer 24.

Any method for removing the passivation layer 24 could be adopted as well. For example, to etch the passivation layer 24 directly could remove the passivation layer 24 itself. Or, to illuminate the passivation layer 24 could decompose the passivation layer 24 itself. The detailed description of methods for removing the passivation layer 24 will not herein be repeated.

Figure 6:
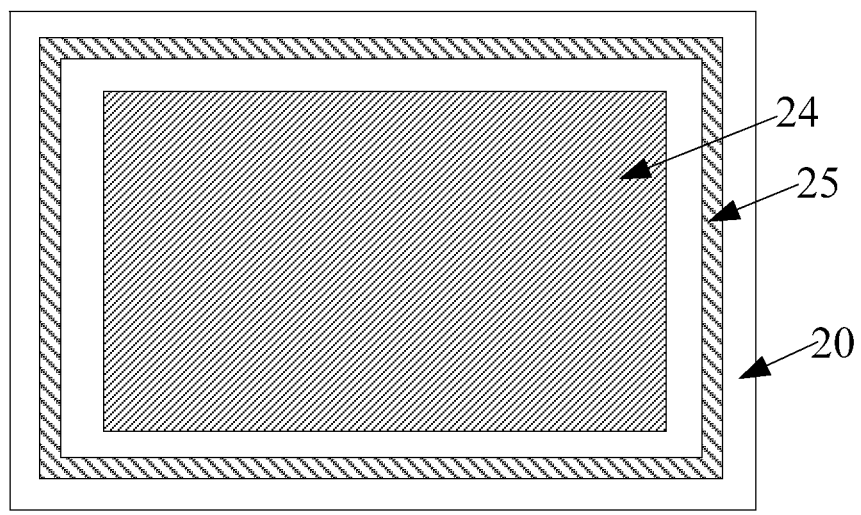
FIG. 6 is a top view of a TFT substrate after a housing is formed on it.

In Step S205, the sealant domain 21 is coated and a housing 25 is formed, as shown in FIG. 6. At this point, liquid crystals are sprayed onto the alignment film 23, and the second substrate attaches to the first substrate with the housing 25. Thus, a liquid crystal panel such as a TFT-LCD panel is formed.

The passivation layer 24 is formed on the surface of the alignment film 23 after the alignment film 23 is formed and before liquid crystals are sprayed onto the alignment film 23 in the present invention. The passivation layer 24 is effective for preventing hydrolysis occurring at the alignment film 23, which prolongs the Q-time that the manufacturing process needs. So the mura defect would not exist in the liquid crystal panel. The passivation layer 24 is also effective for preventing particles flowing in the air from dropping on the surface of the alignment film 23. The surface of the alignment film 23 could maintain clean all the time. It not only makes sure that no mura defects exist in the liquid crystal panel but also increases the yield rate of the liquid crystal panel.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:
1. A manufacturing method of a liquid crystal panel, comprising following steps of:
providing a first substrate and a second substrate, and coating an alignment film the first substrate for forming made, wherein the first substrate is a thin film transistor (TFT) substrate;

forming a passivation layer on a surface of the alignment film;

heating the passivation layer to decompose the passivation layer when a predetermined Q-time arrives; and spraying liquid crystals onto the surface of the alignment film, and attaching the second substrate to the first substrate for forming a liquid crystal panel.

2. The manufacturing method as claimed in claim 1, wherein the passivation layer is made of polymers.

3. The manufacturing method as claimed in claim 2, wherein the polymers are polyurethane (PU).

4. The manufacturing method as claimed in claim 1, wherein the step of removing the passivation layer comprises:

spraying a solvent on the passivation layer for dissolving and removing the passivation layer with the solvent.

5. The manufacturing method as claimed in claim 1, wherein the step of removing the passivation layer comprises:

illuminating the passivation layer to decompose the passivation layer.

6. The manufacturing method as claimed in claim 1, wherein the predetermined Q-time is between 10 and 30 seconds.

7. The manufacturing method as claimed in claim 1, wherein the second substrate is a color filter (CF) substrate.

8. A manufacturing method of a liquid crystal panel, comprising following steps of:

providing a first substrate and a second substrate, and coating an alignment film on the first substrate;

forming a passivation layer on a surface of the alignment film;

heating the passivation layer to decompose the passivation layer when a predetermined Q-time arrives;

spraying liquid crystals onto the surface of the alignment film, and attaching the second substrate to the first substrate for forming a liquid crystal panel.

9. The manufacturing method as claimed in claim 8, wherein the passivation layer is made of polymers.

10. The manufacturing method as claimed in claim 9, wherein the polymers are polyurethane (PU).

11. The manufacturing method as claimed in claim 8, wherein the step of forming the passivation layer on the surface of the alignment film comprises:

forming the passivation layer on the surface of the alignment film by means of coating.

12. The manufacturing method as claimed in claim 8, wherein the step of removing the passivation layer comprises:

spraying a solvent on the passivation layer for dissolving and removing the passivation layer with the solvent.

13. The manufacturing method as claimed in claim 8, wherein the step of removing the passivation layer comprises:

illuminating the passivation layer to decompose the passivation layer.

14. The manufacturing method as claimed in claim 8, wherein the predetermined Q-time is between 10 and 30 seconds.

15. The manufacturing method as claimed in claim 8, wherein the first substrate is a thin film transistor (TFT) substrate.

16. The manufacturing method as claimed in claim 8, wherein the second substrate is a color filter (CF) substrate.

* * * * *